United States Patent
Ramesh Babu et al.

(10) Patent No.: US 11,978,151 B2
(45) Date of Patent: May 7, 2024

(54) MULTI-LEVEL BOUNDING VOLUME HIERARCHY COALESCING

(71) Applicant: QUALCOMM Incorporated, San Diego, CA (US)

(72) Inventors: Adimulam Ramesh Babu, San Diego, CA (US); Srihari Babu Alla, San Diego, CA (US); Avinash Seetharamaiah, San Diego, CA (US); Jonnala Gadda Nagendra Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/823,948

(22) Filed: Aug. 31, 2022

(65) Prior Publication Data
US 2024/0070964 A1    Feb. 29, 2024

(51) Int. Cl.
*G06T 15/06* (2011.01)
*G06T 1/20* (2006.01)
*G06T 1/60* (2006.01)
*G06T 17/00* (2006.01)

(52) U.S. Cl.
CPC ............... *G06T 15/06* (2013.01); *G06T 1/20* (2013.01); *G06T 1/60* (2013.01); *G06T 17/005* (2013.01); *G06T 2210/12* (2013.01)

(58) Field of Classification Search
CPC .. G06T 15/06; G06T 1/20; G06T 1/60; G06T 17/005
USPC .......................................................... 345/419
See application file for complete search history.

(56) References Cited

U.S. PATENT DOCUMENTS

| | | | |
|---|---|---|---|
| 11,087,522 B1* | 8/2021 | Surti ....................... G06T 15/06 |
| 11,593,990 B1* | 2/2023 | Ramesh Babu .......... G06T 1/60 |
| 2021/0049805 A1* | 2/2021 | Wald ........................ G06T 1/20 |
| 2022/0198739 A1* | 6/2022 | Saleh ..................... G06T 15/06 |

* cited by examiner

*Primary Examiner* — Thomas J Lett
(74) *Attorney, Agent, or Firm* — QUALCOMM Incorporated

(57) ABSTRACT

Aspects presented herein relate to methods and devices for graphics processing including an apparatus, e.g., a GPU. The apparatus may obtain an indication of a BVH structure including a plurality of nodes, wherein the BVH structure is associated with geometry data for a plurality of primitives in a scene, wherein each of the plurality of nodes is associated with one or more primitives, where a first level BVH includes a set of first nodes and a second level BVH includes a set of second nodes. The apparatus may also allocate information for a plurality of second nodes in the set of second nodes to at least one first node in the set of first nodes. Further, the apparatus may store the allocated information for the plurality of second nodes in the set of second nodes in the at least one first node in the set of first nodes.

30 Claims, 12 Drawing Sheets

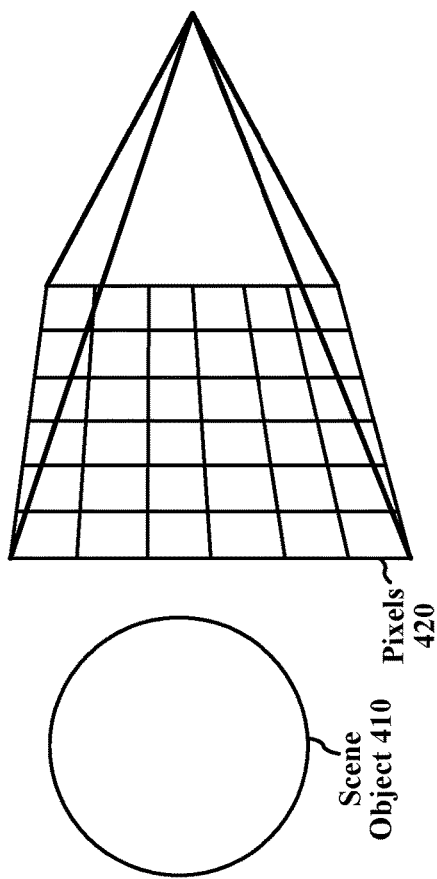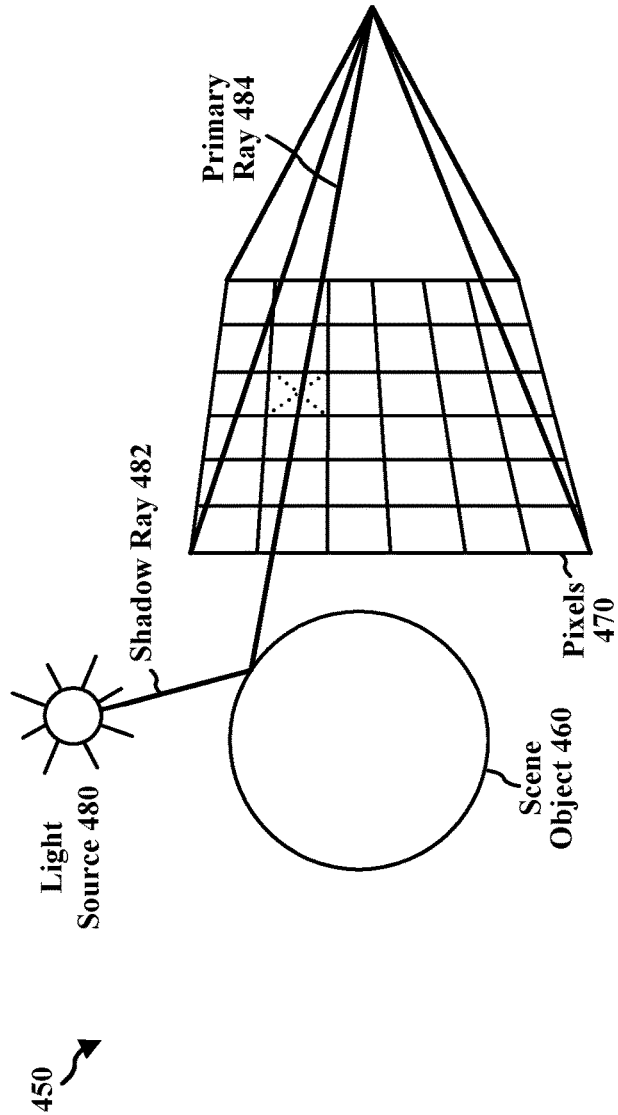

MULTI-LEVEL BOUNDING VOLUME HIERARCHY COALESCING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

Currently, there is a need for improved graphics processing. For instance, current node storage techniques in graphics processing may not efficiently store acceleration structures. Accordingly, there has developed an increased need for improved node storage techniques to efficiently store acceleration structures.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may receive a second indication of a plurality of primitives in a scene prior to obtaining an indication of a bounding volume hierarchy (BVH) structure, where the indication of a BVH structure is obtained based on the second indication of the plurality of primitives. The apparatus may also obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes. Additionally, the apparatus may configure or generate the BVH structure including the plurality of nodes based on obtaining the indication of the BVH structure including the plurality of nodes. The apparatus may also allocate information for a plurality of second nodes in the set of second nodes to at least one first node in the set of first nodes. The apparatus may also store the allocated information for the plurality of second nodes in the set of second nodes in the at least one first node in the set of first nodes. Moreover, the apparatus may program a graphics processing unit (GPU) to traverse the BVH structure including the plurality of nodes based on the allocated information for the plurality of second nodes that is stored in the at least one first node.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating an example rasterization process.

FIG. 4B is a diagram illustrating an example ray tracing process.

DETAILED DESCRIPTION

Figure 1:
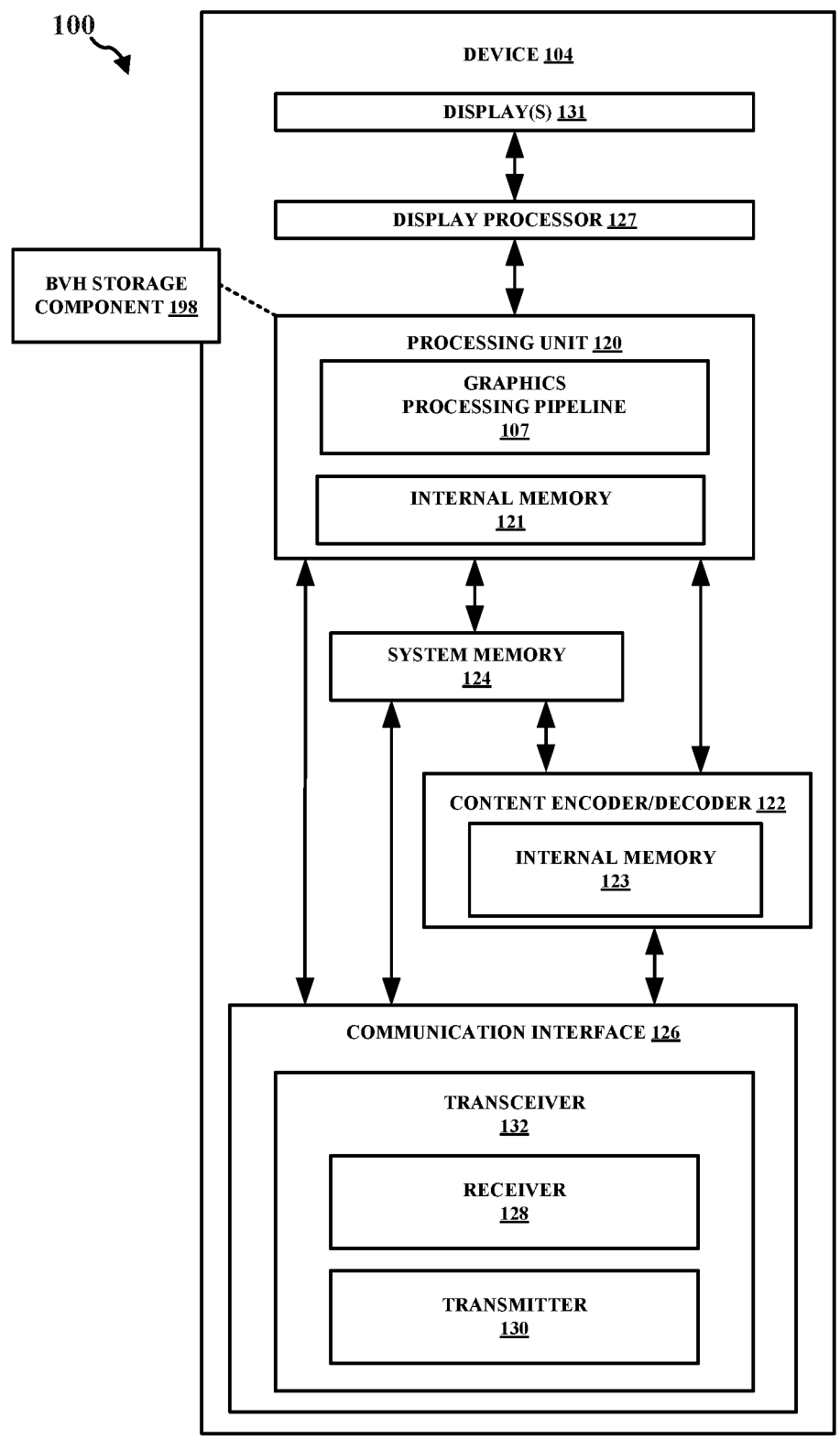
FIG. 1 is a block diagram that illustrates an example content generation system.

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). An acceleration structure or BVH structure is a tree structure including multiple nodes (e.g., a binary tree structure or a n-ary tree structure), where primitive data is stored in leaf nodes (i.e., the nodes in the branches of the tree structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold a large number of primitives (e.g., millions of primitives). Bounding volume hierarchies (BVHs) and similar data structures are an efficient manner in which to store the geometry data for accelerating ray tracing performance. Although binary BVHs with a single primitive in a leaf node and one bounding box in an internal node may be helpful to improve ray tracing performance, increasing the width of BVHs to certain levels may improve the performance of ray tracing at a GPU. For example, increasing the width of BVHs to certain levels (e.g., an 8-wide BVH with up to 8 child nodes and up to 4 primitives in leaf nodes) based on surface area heuristics (SAH) may improve the performance of ray tracing at a GPU. In some aspects, rather than building all the geometry to a single BVH, some types of application program interfaces (APIs) may split the geometry to multiple bottom-level BVHs (i.e., one or more sections of a BVH that are below another section of the BVH) which contain the primitive geometry (e.g., triangles or bounding boxes) and a top-level BVH (i.e., one or more sections of a BVH that are above another section of the BVH). In some instances, a top-level BVH may be formed with the bottom-level BVH references. Also, splitting the geometry between bottom-level BVHs and creating a top level BVH may increase the flexibility and reusability of the geometry, as well as increase the surface area heuristic (SAH) of the overall structure. In some aspects, a bottom-level BVH may store multiple primitives in its leaf node, whereas a top-level BVH may store just one bottom-level BVH in its leaf node. For instance, a top-level BVH may store one bottom-level BVH in its leaf node due to the additional information that is needed, so multiple bottom-level BVHs may not be able to be stored in a top-level BVH leaf node. Also, in the case where geometry is not split properly across the bottom-level BVH, the SAH and ray tracing performance may be degraded. For example, geometry from different parts of a scene may be added to a BVH and not split properly across the bottom-level BVH, such that the SAH and ray tracing performance may be degraded. The geometry data for nodes in a bottom-level BVH structure may be allocated to a memory. However, the geometry data of a bottom-level BVH structure may be spread across opposite corners of memory. Further, the bounding box of a bottom-level BVH structure may have a lot of empty space in the middle. Accordingly, all the rays that are shot into the empty space may hit a root node of the bottom-level BVH structure. By doing so, a ray may need to be transformed from the top-level BVH structure to bottom-level BVH structure for all the rays that are shot into the empty space, and then the bottom-level BVH structure may need to be fetched and traversed. Aspects of the present disclosure may reduce the amount of nodes that need to be traversed in an overall BVH. For instance, aspects of the present disclosure may reduce the amount of hops for rays in a ray tracing process. In order to do so, aspects of the present disclosure may reduce the amount of surface area heuristics (SAH) for bottom-level BVHs. Additionally, aspects presented herein may reduce the amount of top-level to bottom-level ray transformations. By doing so, aspects presented herein may reduce the overall memory footprint of the storage process for BVHs. In some instances, rather than transforming a ray for every child node, aspects of the present disclosure may pass a transformed ray to all intersected boxes in the leaf node. Based on this, aspects presented herein may build a top-level BVH, as there may be no dependency across the bottom-level BVH.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. In some aspects of graphics processing, loading these acceleration structures (e.g., BVH structures) into on-chip graphics memory at a GPU may help to achieve quicker access to data and eventually faster ray tracing performance. However, in some instances, the size of the acceleration structures (e.g., BVH structures) may be much larger than the size of the on-chip memory. In order to overcome this size differential, smaller acceleration structures may be loaded onto the on-chip memory in a fashion similar to top level acceleration structures. Also, some small bottom level acceleration structures (i.e., small in size compared to top level acceleration structures) may also be placed in the on-chip memory. However, due to the organization of the bottom level acceleration structures, it may be difficult to access these bottom level acceleration structures from the on-chip memory. As such, these bottom level acceleration structures may not be able to be accessed frequently enough to satisfy ray tracing performance specifications. Aspects of the present disclosure may optimize the storage of acceleration structures (e.g., BVH structures) associated with ray tracing processes. For instance, aspects of the present disclosure may store bottom level acceleration structures in certain types of memory such that these structures are easily accessible. In order to do so, aspects of the present disclosure may store bottom level BVH structures in an on-chip graphics memory (GMEM), as well as store the bottom level BVH structures in a system memory (SYSMEM). By doing so, aspects presented herein may more easily access the BVH structures from the on-chip graphics memory. In some instances, aspects of the present disclosure may store different levels of the bottom level BVH structures in both on-chip graphics memory and system memory.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a BVH storage component 198 configured to receive a second indication of a plurality of primitives in a scene prior to obtaining an indication of a bounding volume hierarchy (BVH) structure, where the indication of a BVH structure is obtained based on the second indication of the plurality of primitives. The BVH storage component 198 may also be configured to obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes. The BVH storage component 198 may also be configured to configure or generate the BVH structure including the plurality of nodes based on obtaining the indication of the BVH structure including the plurality of nodes. The BVH storage component 198 may also be configured to allocate information for a plurality of second nodes in the set of second nodes to at least one first node in the set of first nodes. The BVH storage component 198 may also be configured to store the allocated information for the plurality of second nodes in the set of second nodes in the at least one first node in the set of first nodes. The BVH storage component 198 may also be configured to program a graphics processing unit (GPU) to traverse the BVH structure including the plurality of nodes based on the allocated information for the plurality of second nodes that is stored in the at least one first node. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
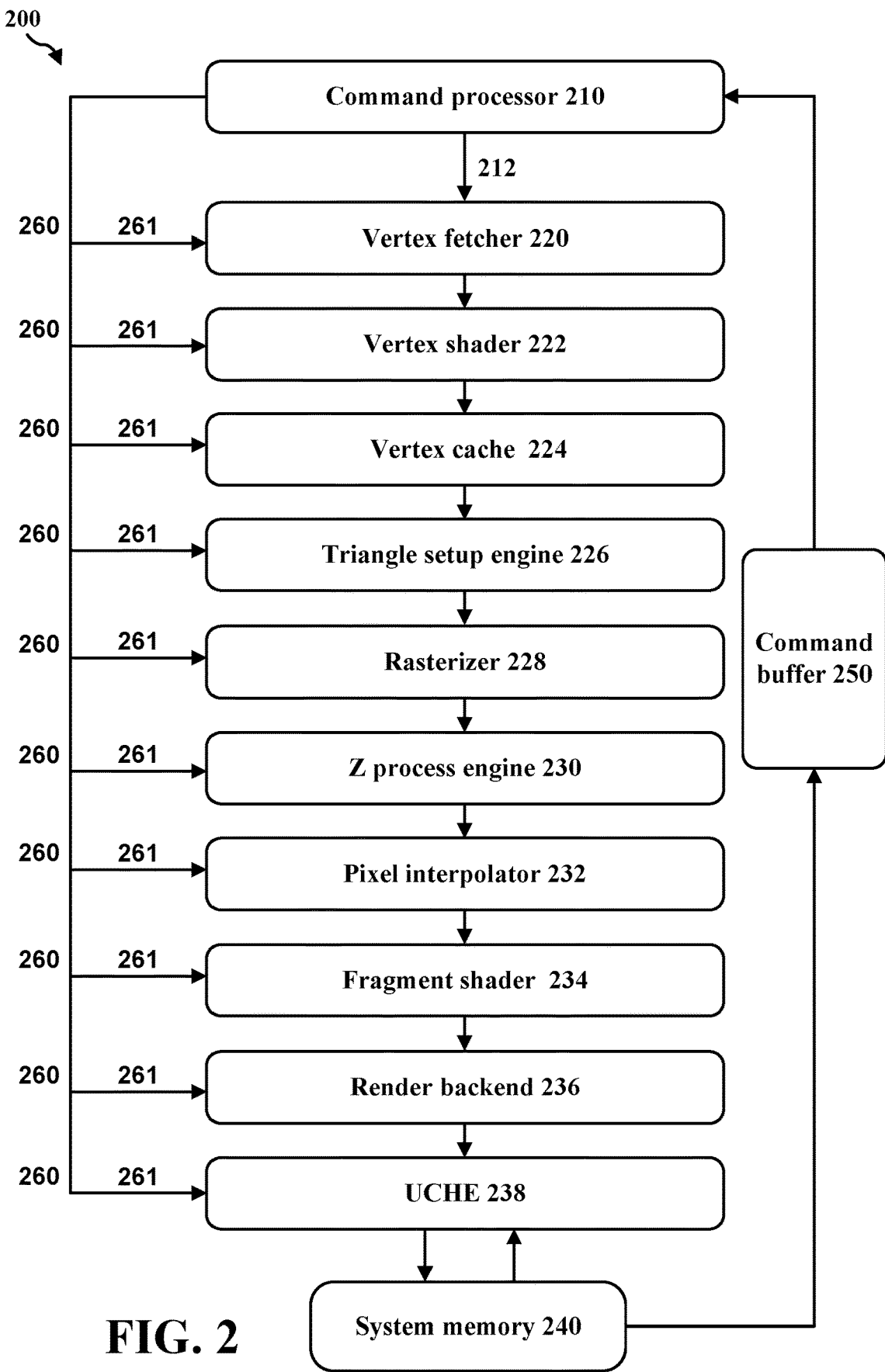
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce incredibly realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
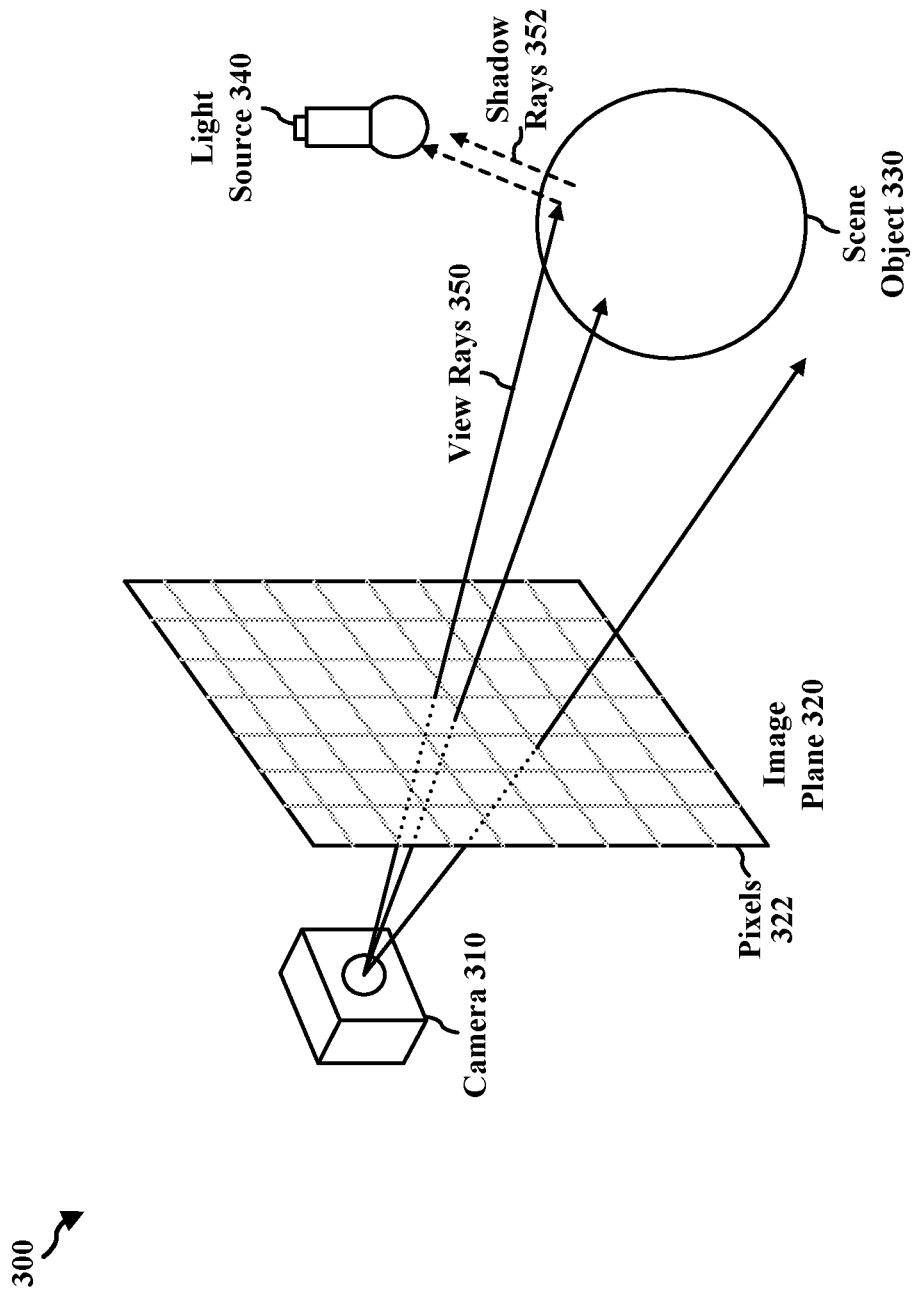
FIG. 3 is a diagram illustrating an example ray tracing process.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or strike a certain primitive, then the pixel is shaded. In some instances of graphics processing, ray tracing algorithms may be performed alongside rasterization, such as via a hybrid ray tracing/rasterization model.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or strike a certain primitive in scene object 460 corresponding to one of the pixels 470 via primary ray 484, then the pixel is shaded.

As indicated herein, the process of ray tracing may be performed by determining whether a ray will hit/strike any primitive(s) in a scene. For example, ray tracing algorithms may perform a simple query operation: Is a given ray going to hit/strike any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to strike primitives in a scene ($t_{min}$), a maximum time to strike primitives in a scene ($t_{max}$), and a calculated distance to strike primitives in the scene.

Figure 5:
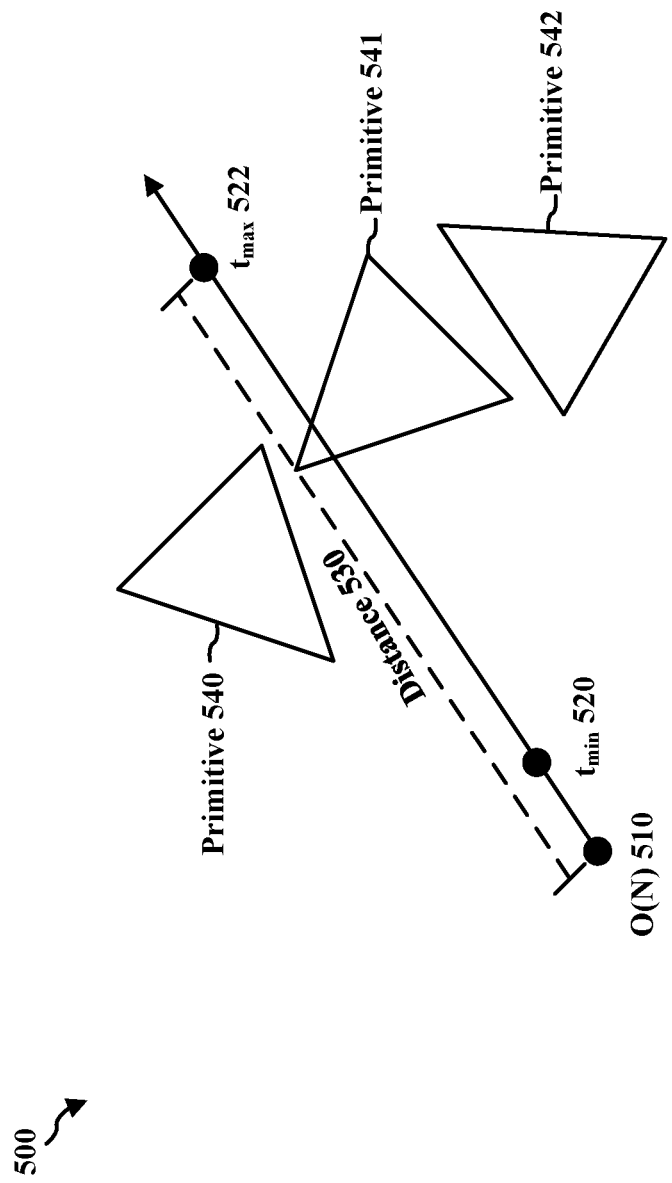
FIG. 5 is a diagram illustrating an example ray tracing process.

FIG. 5 illustrates diagram 500 including one example of a ray tracing process. As shown in FIG. 5, diagram 500 includes origin point for a ray (O(N) 510), a minimum time to strike primitives in a scene ($t_{min}$ 520), a maximum time to strike primitives in a scene ($t_{max}$ 522), a calculated distance to strike primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will strike a primitive, ray tracing techniques may utilize an origin point for a ray (O(N) 510), a minimum time to strike primitives ($t_{min}$ 520), a maximum time to strike primitives ($t_{max}$ 522), a calculated distance to strike primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal nodes may hold access aligned bounding boxes (AABBs) that enclose certain leaf node geometry. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
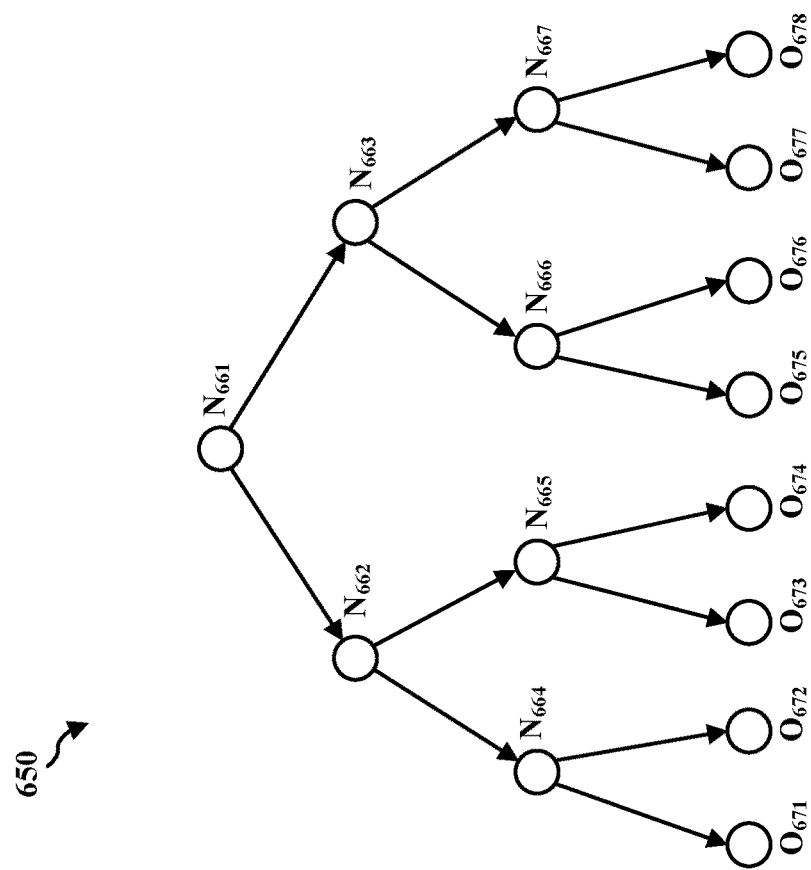
FIG. 6B is a diagram illustrating an example data structure.
Figure 6A:
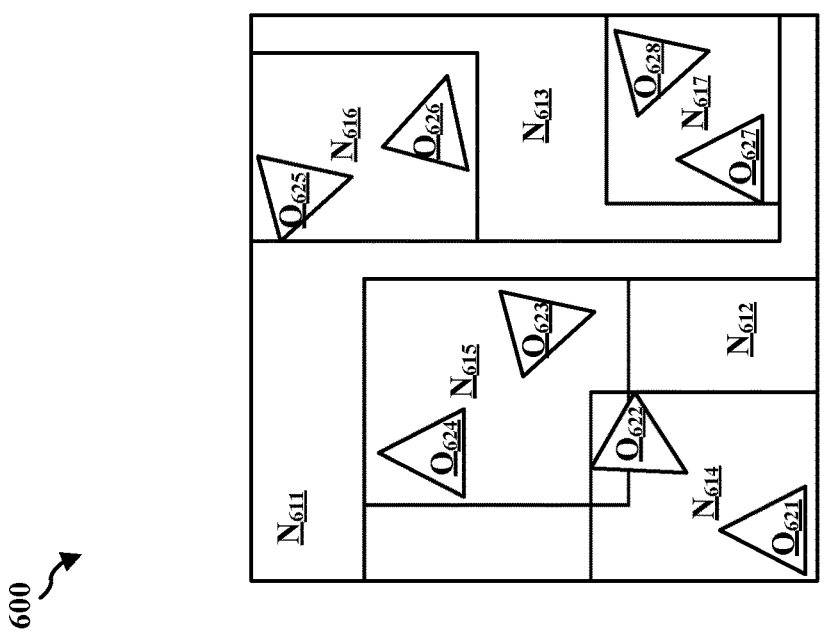
FIG. 6A is a diagram illustrating an example data structure.

FIGS. 6A and 6B illustrate diagram 600 and diagram 650, respectively, including example data structure techniques utilized in ray tracing. As shown in FIG. 6A, diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

Figures 7A, 7B:
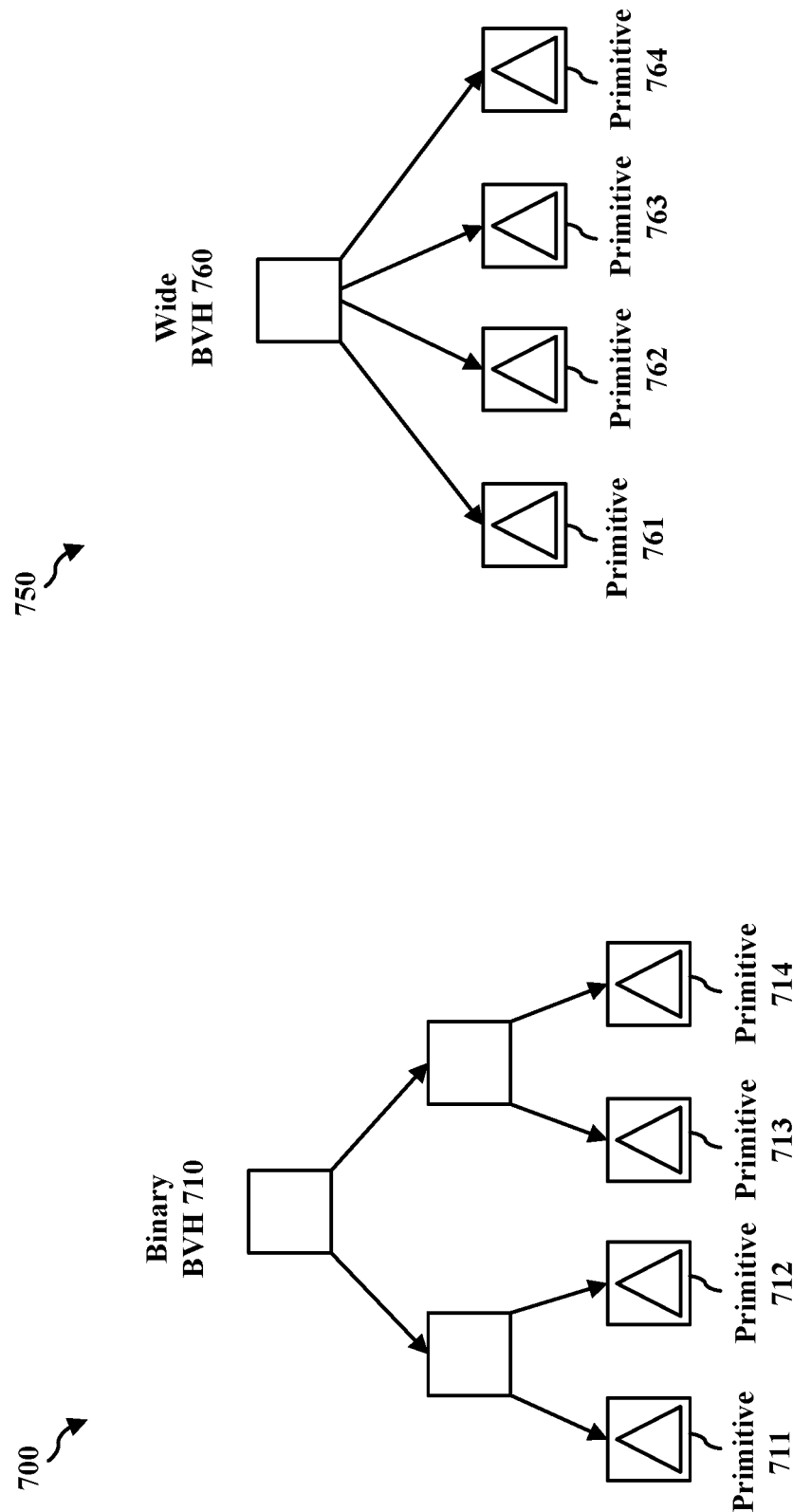
FIG. 7A is a diagram illustrating an example bounding volume hierarchy (BVH).
FIG. 7B is a diagram illustrating another example BVH.

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes three levels, where primitives 711-714 are in the third level of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes two levels, where primitives 761-764 are in the second level of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/CPU hardware or software. For instance, in certain stages, a driver may construct the BVH on a CPU or GPU (e.g., a BVH construction stage and a BVH node compression stage). In a BVH traversal stage, the BVH traversal may occur in the shader at the GPU. Also, certain stages may be implemented in the GPU hardware (e.g., a BVH node decompression stage, a ray-bounding box intersection stage, and a ray-triangle intersection stage).

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). An acceleration structure or BVH structure is a tree structure including multiple nodes (e.g., a binary tree structure or a n-ary tree structure), where primitive data is stored in leaf nodes (i.e., the nodes in the branches of the tree structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold a large number of primitives (e.g., millions of primitives).

Bounding volume hierarchies and similar data structures are an efficient manner in which to store the geometry data for accelerating ray tracing performance. Although binary BVHs with a single primitive in a leaf node and one bounding box in an internal node may be helpful to improve ray tracing performance, increasing the width of BVHs to certain levels may improve the performance of ray tracing at a GPU. For example, increasing the width of BVHs to certain levels (e.g., an 8-wide BVH with up to 8 child nodes and up to 4 primitives in leaf nodes) based on surface area heuristics (SAH) may improve the performance of ray tracing at a GPU.

In some aspects, rather than building all the geometry to a single BVH, some types of application program interfaces (APIs) may split the geometry to multiple bottom-level BVHs (i.e., one or more sections of a BVH that are below another section of the BVH) which contain the primitive geometry (e.g., triangles or bounding boxes) and a top-level BVH (i.e., one or more sections of a BVH that are above another section of the BVH). In some instances, a top-level BVH may be formed with the bottom-level BVH references. Also, splitting the geometry between bottom-level BVHs and creating a top level BVH may increase the flexibility and reusability of the geometry, as well as increase the surface area heuristic (SAH) of the overall structure. In some aspects, a bottom-level BVH may store multiple primitives in its leaf node, whereas a top-level BVH may store just one bottom-level BVH in its leaf node. For instance, a top-level BVH may store one bottom-level BVH in its leaf node due to the additional information that is needed, so multiple bottom-level BVHs may not be able to be stored in a top-level BVH leaf node. Also, in the case where geometry is not split properly across the bottom-level BVH, the SAH and ray tracing performance may be degraded. For example, geometry from different parts of a scene may be added to a BVH and not split properly across the bottom-level BVH, such that the SAH and ray tracing performance may be degraded.

Figure 8:
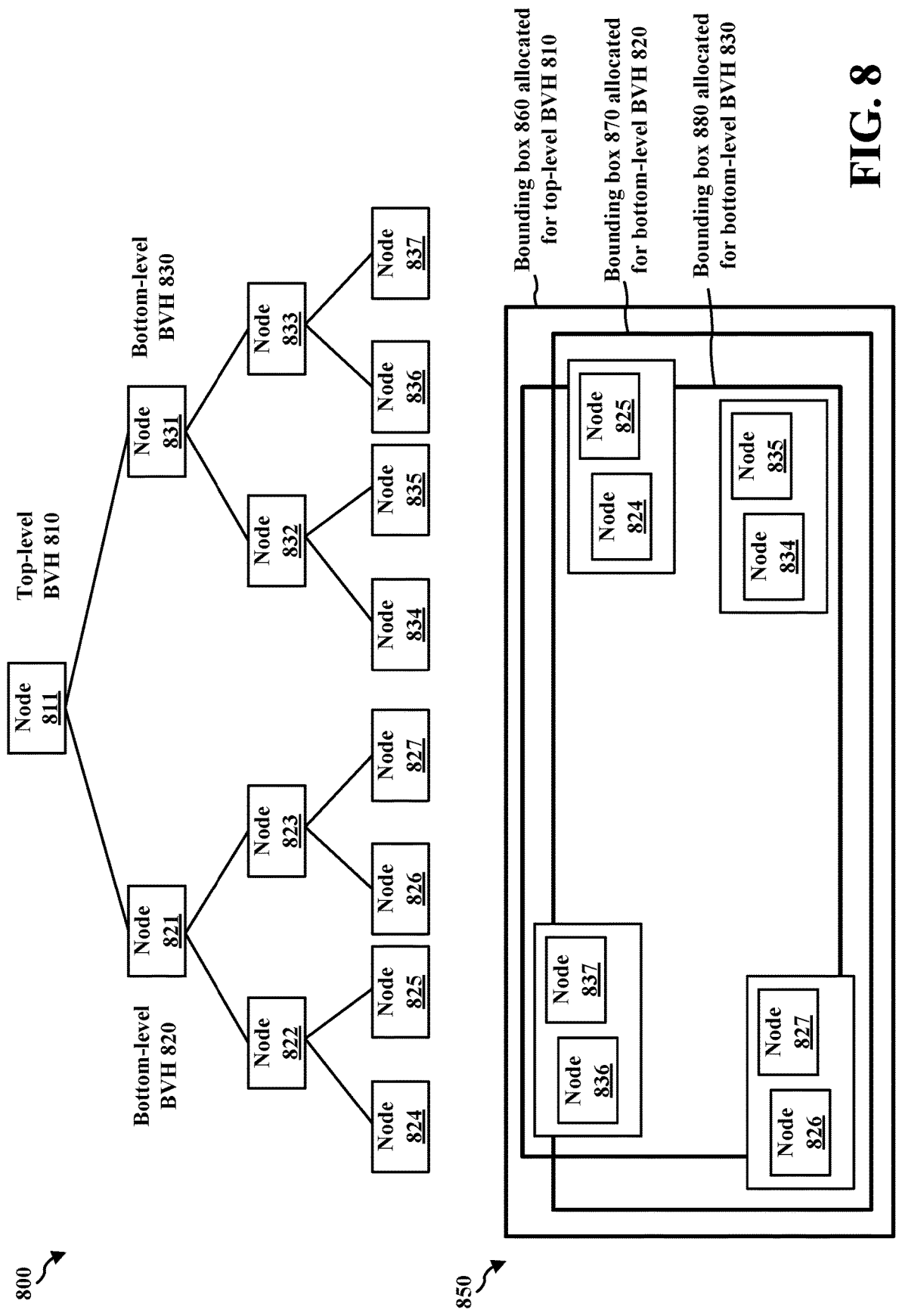
FIG. 8 is a diagram illustrating an example tree structure for node storage and an example of bounding boxes for corresponding internal nodes for a BVH.

FIG. 8 illustrates diagram 800 including one example of a tree structure for node storage, as well as diagram 850 including an example of bounding boxes for corresponding internal nodes in a BVH. More specifically, diagram 800 includes a top-level BVH structure and two bottom-level BVH structures for storing different nodes of the BVH structure. As shown in FIG. 8, diagram 800 includes at least one node in a top-level BVH structure 810 (e.g., node 811), multiple nodes in a bottom-level BVH structure 820 (e.g., node 821, node 822, node 823, node 824, node 825, node 826, and node 827), and multiple nodes in a bottom-level BVH structure 830 (e.g., node 831, node 832, node 833, node 834, node 835, node 836, and node 837). In some aspects, top-level BVH structure 810, bottom-level BVH structure 820, and bottom-level BVH structure 830 may be considered part of the same BVH structure, such that all of the nodes shown in diagram 800 are in the same BVH structure. Further, each of the nodes depicted in FIG. 8 (e.g., node 811, node 821, node 822, node 823, node 824, node 825, node 826, node 827, node 831, node 832, node 833, node 834, node 835, node 836, and node 837) may correspond to a bounding box.

As further shown in FIG. 8, diagram 850 includes a bounding box for top-level BVH structure 810, bottom-level BVH structure 820, and bottom-level BVH structure 830. For instance, diagram 850 includes bounding box 860 that is calculated for top-level BVH structure 810 (e.g., node 811 in top-level BVH structure 810), bounding box 870 that is calculated for bottom-level BVH structure 820 (e.g., node 821 in bottom-level BVH structure 820), and bounding box 880 that is calculated for bottom-level BVH structure 830 (e.g., node 831 in bottom-level BVH structure 830). For example, as shown in diagram 850, the data for nodes in bottom-level BVH structure 820 (e.g., data for node 824, node 825, node 826, and node 827) are included in the bounding box 870. Further, the data for nodes in bottom-level BVH structure 830 (e.g., data for node 834, node 835, node 836, and node 837) are included in the bounding box 880. Also, some of the data for the nodes in bottom-level BVH structure 820 (e.g., node 824, node 825, node 826, and node 827) that corresponds to bounding boxes for one BVH may overlap with bounding boxes for another BVH. Moreover, some of the data for the nodes in bottom-level BVH structure 830 (e.g., node 836 and node 837) that corresponds to bounding box 880 may overlap with the bounding box 870.

As shown in FIG. 8, the geometry data for nodes in bottom-level BVH structure 820 (e.g., data for node 824, node 825, node 826, and node 827) and the geometry data for nodes in bottom-level BVH structure 830 (e.g., data for node 834, node 835, node 836, and node 837) are included in the bounding box 860. However, the geometry data of bottom-level BVH structure 820 and bottom-level BVH structure 830 may be spread across opposite corners of the scene. Further, the bounding box of bottom-level BVH structure 820 (e.g., for node 821) and bottom-level BVH structure 830 (e.g., for node 831) may have a lot of empty space in the middle. Accordingly, all the rays that are shot into the empty space may hit a root node of the bottom-level BVH structure 820 (e.g., node 821) and bottom-level BVH structure 830 (e.g., node 831). By doing so, a ray may need to be transformed from the top-level BVH structure 810 to bottom-level BVH structure 820 or bottom-level BVH structure 830 for all the rays that are shot into the empty space, and then the bottom-level BVH structure 820 or bottom-level BVH structure 830 may need to be fetched and traversed. Based on the above, it may be beneficial to reduce the amount of nodes that may need to be traversed in an overall BVH. It may also be beneficial to reduce the amount of hops for rays in a ray tracing process.

Aspects of the present disclosure may reduce the amount of nodes that need to be traversed in an overall BVH. For instance, aspects of the present disclosure may reduce the amount of hops for rays in a ray tracing process. In order to do so, aspects of the present disclosure may reduce the amount of surface area heuristics (SAH) for bottom-level BVHs. Additionally, aspects presented herein may reduce the amount of top-level to bottom-level ray transformations. By doing so, aspects presented herein may reduce the overall memory footprint of the storage process for BVHs. In some instances, rather than transforming a ray for every child node, aspects of the present disclosure may pass a transformed ray to all intersected boxes in the leaf node. Based on this, aspects presented herein may build a top-level BVH, as there may be no dependency across the bottom-level BVH.

In some instances, rather than storing a bottom-level BVH root node in a leaf node of a top-level BVH, aspects presented herein may store certain nodes of the bottom-level BVH (e.g., children or grandchildren nodes in the bottom-level BVH) directly in a leaf node of the top-level BVH. For example, aspects presented herein may store geometry data for children or grandchildren nodes in a bottom-level BVH directly in memory allocated for a leaf node of a top-level BVH. Additionally, aspects of the present disclosure may store a maximum number of supported bounding boxes (e.g., bounding boxes for up to 8 nodes) directly in the leaf node of the top-level BVH. The decision to store certain nodes (e.g., children or grandchildren nodes) directly in a leaf node of the top-level BVH may be performed based on a number of factors. For instance, storing geometry data for certain nodes (e.g., children or grandchildren nodes) directly in a leaf node of the top-level BVH may be based on SAH.

Figure 9:
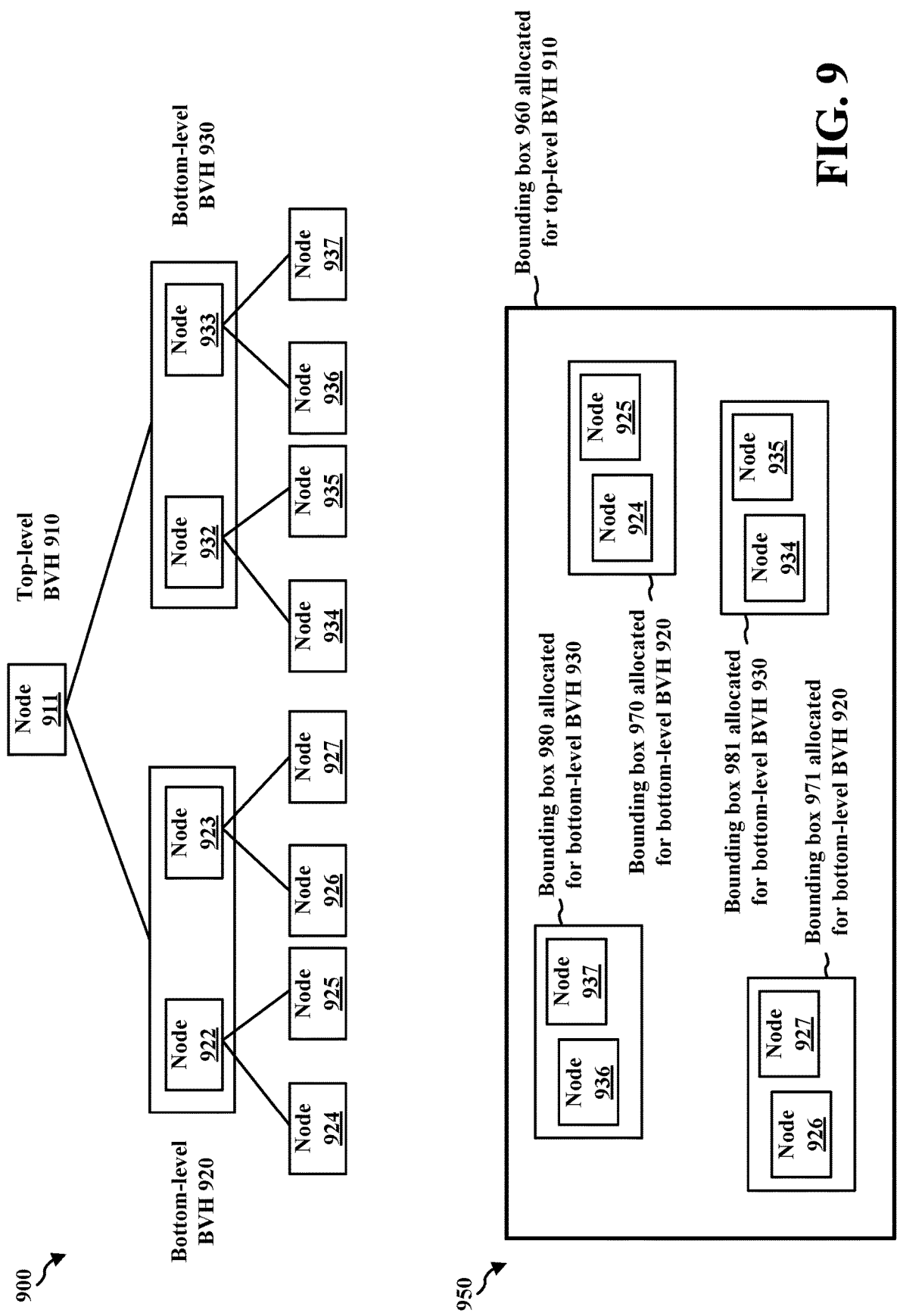
FIG. 9 is a diagram illustrating an example tree structure for node storage and an example of bounding boxes for corresponding internal nodes for a BVH.

FIG. 9 illustrates diagram 900 including one example of a tree structure for node storage, as well as diagram 950 including an example of bounding boxes for corresponding internal nodes in a BVH. More specifically, diagram 900 includes a top-level BVH structure and two bottom-level BVH structures for storing different nodes of the structures. As shown in FIG. 9, diagram 900 includes a node in a top-level BVH structure 910 (e.g., node 911), nodes in a bottom-level BVH structure 920 (e.g., node 922, node 923, node 924, node 925, node 926, and node 927), and nodes in a bottom-level BVH structure 930 (e.g., node 932, node 933, node 934, node 935, node 936, and node 937). In some aspects, top-level BVH structure 910, bottom-level BVH structure 920, and bottom-level BVH structure 930 may be considered part of the same BVH structure, such that all of the nodes shown in diagram 900 are in the same BVH structure. As depicted in FIG. 9, the nodes in top-level BVH structure 910, bottom-level BVH structure 920, and bottom-level BVH structure 930 may be stored in different types of memory, such as a graphics memory (GMEM) or a system memory (SYSMEM). Further, each of the nodes depicted in FIG. 9 (e.g., node 911, node 922, node 923, node 924, node 925, node 926, node 927, node 932, node 933, node 934, node 935, node 936, and node 937) may correspond to a bounding box.

As further shown in FIG. 9, diagram 950 includes a bounding box calculated for top-level BVH structure 910, bottom-level BVH structure 920, and bottom-level BVH structure 930. For instance, diagram 950 includes bounding box 960 that is calculated for top-level BVH structure 910 (e.g., node 911 in top-level BVH structure 910), bounding box 970 that is calculated for bottom-level BVH structure 920 (e.g., node 924 and node 925 in bottom-level BVH structure 920), and bounding box 980 that is calculated for bottom-level BVH structure 930 (e.g., node 936 and node 937 in bottom-level BVH structure 930). For example, as shown in diagram 950, the data for some nodes in bottom-level BVH structure 920 (e.g., data for node 924 and node 925) may be allocated to bounding box 970, and the data for other nodes in bottom-level BVH structure 920 (e.g., data for node 926 and node 927) may be allocated to bounding box 971. Further, the data for some nodes in bottom-level BVH structure 930 (e.g., data for node 936 and node 937) may be allocated to bounding box 980, and the data for other nodes in bottom-level BVH structure 930 (e.g., data for node 934 and node 935) may be allocated to bounding box 981.

As shown in FIG. 9, the geometry data for nodes in bottom-level BVH structure 920 (e.g., data for node 924, node 925, node 926, and node 927) and the geometry data for nodes in bottom-level BVH structure 930 (e.g., data for node 934, node 935, node 936, and node 937) are included in bounding box 960. This geometry data of bottom-level BVH structure 920 and bottom-level BVH structure 930 may be spread across bounding box 960, such that none of the data for bottom-level BVH structure 920 may overlap with the data for bottom-level BVH structure 930. Moreover, the bounding box of bottom-level BVH structure 920 (e.g., for node 922 and node 923) and bottom-level BVH structure 930 (e.g., for node 932 and node 933) may not have a lot of empty space in the middle. As such, all the rays that are shot into the space may not hit a root node of the bottom-level BVH structure 920 and bottom-level BVH structure 930. Thus, a ray may not need to be transformed from the top-level BVH structure 910 to bottom-level BVH structure 920 or bottom-level BVH structure 930 for all those rays that are shot into the bounding boxes. By doing so, the bottom-level BVH structure 920 or bottom-level BVH structure 930 may not need to be unnecessarily fetched and traversed. In turn, this may help to reduce the memory footprint of the storage process for the BVHs.

As depicted in FIG. 9, aspects presented herein may store the individual bounding boxes for nodes in bottom-level BVH structure 920 (e.g., data for node 922 and node 923, as well as data for node 924, node 925, node 926, and node 927) and nodes in bottom-level BVH structure 930 (e.g., data for node 932 and node 933, as well as data for node 934, node 935, node 936, and node 937) directly in the leaf nodes of top-level BVH structure 910 (e.g., node 911). For example, in one instance, aspects presented herein may store the bounding boxes for node 922 and node 923. Also, in another instance, aspects presented herein may skip node 922 and store the bounding boxes for node 924 and node 925. Further, aspects presented herein may skip node 923 and store the bounding boxes for node 926 and node 927. Additionally, in one instance, aspects presented herein may store the bounding boxes for node 932 and node 933. Also, in another instance, aspects presented herein may skip node 932 and store the bounding boxes for node 934 and node 935. Further, aspects presented herein may skip node 933 and store the bounding boxes for node 936 and node 937. Aspects presented herein may store these individual bounding boxes rather than storing the combined bounding box of a root node of bottom-level BVH structure 920 and bottom-level BVH structure 930. By storing the multiple boxes in the leaf node, the rays that may be shot into the empty space for the combined bounding box of a root node may miss the top-level BVH leaf nodes. In some aspects, if a certain number of bounding boxes (e.g., 4 bounding boxes) in a node are intersected, these bounding boxes may be added directly to the leaf node of the top-level BVH structure 910. For example, if GPU hardware intersects a certain number of bounding boxes (e.g., 4 bounding boxes) in a node (e.g., node 924, node 925, node 926, node 927, and/or node 934, node 935, node 936, and node 937), these bounding boxes may be added directly to the leaf node of the top-level BVH structure 910 (e.g., node 911).

As shown in FIG. 9, aspects presented herein may also include different methods to allocate or store information for node at different levels of a BVH structure. For instance, aspects of the present disclosure may allocate or store information for certain bottom-level nodes (e.g., bottom-level child nodes) in certain top-level nodes (e.g., a top-level leaf node). For example, as shown in FIG. 9, information for bottom-level child nodes in bottom-level BVH structure 920 (e.g., node 924, node 925, node 926, and/or node 927) and bottom-level BVH structure 930 (e.g., node 934, node 935, node 936, and/or node 937) may be stored in a top-level leaf node in top-level BVH structure 910 (e.g., node 911). For instance, the information that is being stored in the top-level leaf node may correspond to node 922 and node 923 for bottom-level BVH structure 920, and the information that is being stored in the top-level leaf node may correspond to node 932 and node 933 for bottom-level BVH structure 930. Moreover, as shown in FIG. 9, information for bottom-level child nodes in bottom-level BVH structure 920 (e.g., node 924, node 925, node 926, and/or node 927) or bottom-level BVH structure 930 (e.g., node 934, node 935, node 936, and/or node 937) may be stored in a top-level leaf node in top-level BVH structure 910 (e.g., node 911). Additionally, all of the multiple second child nodes in bottom-level BVH structure 920 and bottom-level BVH structure 930 (e.g., node 924, node 925, node 926, node 927, node 934, node 935, node 936, and/or node 937) may be associated with a same bottom-level acceleration structure (BLAS) identifier (ID) in a set of BLAS IDs. That is, all the bounding boxes being packed in any top level leaf node may correspond to single bottom level BVH. Also, at least one top-level leaf node in top-level BVH structure 910 (e.g., node 911) may be associated with atop-level acceleration structure (TLAS) node ID.

In some aspects, rather than splitting and repacking multiple Bottom BVHs while building a top-level BVH, aspects presented herein may pack the lower levels of a bottom-level BVH in the bottom-level BVH root node. This may reduce certain constraints (e.g., a maximum number of primitives) on a top-level BVH leaf node. By doing so, the overall number of levels and number of nodes may be reduced. Also, aspects presented herein may allow for implementation to be more feasible and quicker. For example, instance data for a top-level BVH leaf node may remain the same. As such, there may be no need to unpack and repack a bottom-level BVH multiple times. Further, there may be no dependencies across the bottom-level BVH. This approach presented herein may take advantage of a capability of GPU hardware in order to intersect multiple bounding boxes in a node at the same time.

Aspects of the present disclosure may include a number of benefits or advantages. For instance, aspects of the present disclosure may reduce the amount of nodes that may need to be traversed in an overall BVH. For instance, aspects of the present disclosure may reduce the amount of hops for rays in a ray tracing process, which may result in an optimized performance of a ray tracing process. In order to do so, aspects of the present disclosure may reduce the amount of surface area heuristics (SAH) for bottom-level BVHs (e.g., reduced by a factor of 0.10 or 10%).

Additionally, aspects presented herein may reduce the amount of top-level to bottom-level ray transformations in a BVH. By doing so, aspects presented herein may reduce the overall memory footprint of the storage process for BVHs. In some instances, rather than transforming a ray for every child node, aspects of the present disclosure may pass a transformed ray to all intersected boxes in a leaf node. Based on this, aspects presented herein may build a top-level BVH, as there may be no dependency across the bottom-level BVH.

Figure 10:
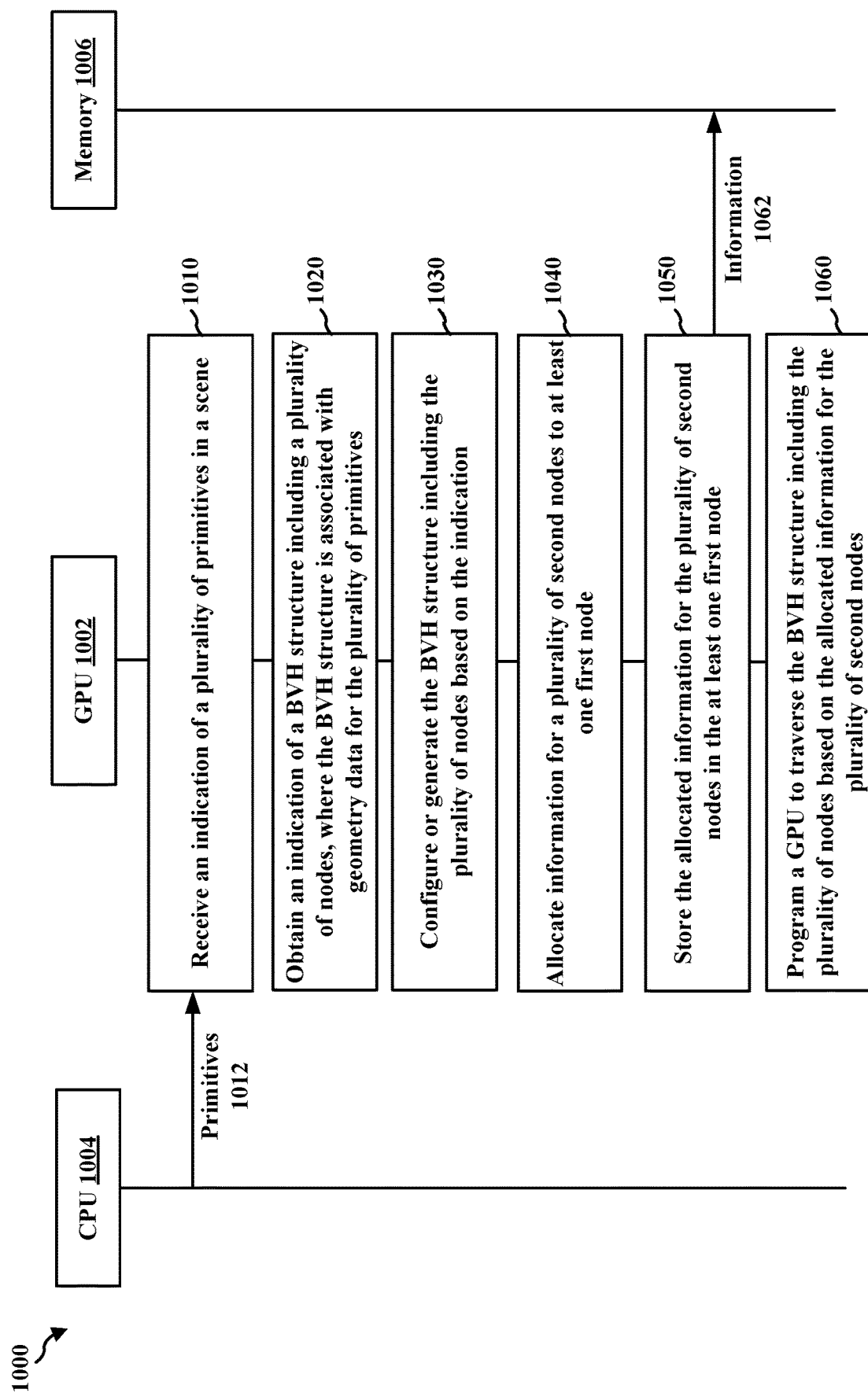
FIG. 10 is a communication flow diagram illustrating example communications between a GPU, a CPU, and a memory.

FIG. 10 is a communication flow diagram 1000 of graphics processing in accordance with one or more techniques of this disclosure. As shown in FIG. 10, diagram 1000 includes example communications between a GPU 1002 (or other graphics processor), CPU 1004 (or other central processor) or another GPU component, and memory 1006 (e.g., GMEM or SYSMEM), in accordance with one or more techniques of this disclosure.

At 1010, GPU 1002 may receive a second indication of a plurality of primitives in a scene prior to obtaining an indication of a bounding volume hierarchy (BVH) structure (e.g., GPU 1002 may receive an indication of primitives 1012 from CPU 1004), where the indication of a BVH structure is obtained based on the second indication of the plurality of primitives.

At 1020, GPU 1002 may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes. The BVH structure may be based on a hierarchy of the plurality of nodes including the set of first nodes and the set of second nodes. The first level BVH may correspond to a top level BVH in the BVH structure and the second level BVH may correspond to bottom level BVH in the BVH structure, such that the set of first nodes is a set of top level nodes and the set of second nodes is a set of bottom level nodes. The set of top level nodes may include at least one top level internal node and a set of top level leaf nodes, and the set of bottom level nodes may include at least one bottom level internal node and a set of bottom level leaf nodes. In some aspects, the set of first nodes may be associated with a first amount of rays in a ray tracing process for the plurality of primitives in the scene, and the set of second nodes may be associated with a second amount of rays in the ray tracing process for the plurality of primitives in the scene. Additionally, the set of first nodes may be associated with a top level acceleration structure (TLAS) identifier (ID), where each of the set of second nodes may be associated with a corresponding bottom level acceleration structure (BLAS) ID in a set of BLAS IDs, and where each corresponding BLAS ID may be associated with at least one second node in the set of second nodes. Further, the indication of the BVH structure may be obtained from a central processing unit (CPU) or at least one component in a graphics processing unit (GPU).

At 1030, GPU 1002 may configure or generate the BVH structure including the plurality of nodes based on obtaining the indication of the BVH structure including the plurality of nodes.

At 1040, GPU 1002 may allocate information for a plurality of second nodes in the set of second nodes to at least one first node in the set of first nodes. The information for the plurality of second nodes may be allocated based on surface area heuristics (SAH), such that the information for the plurality of second nodes may be allocated based on a surface area corresponding to each of the plurality of second nodes, and where the surface area may be associated with a same bottom level acceleration structure (BLAS) identifier (ID) in a set of BLAS IDs. In some instances, the plurality of second nodes may include multiple second child nodes that are associated with a second root node in the set of second nodes, and the at least one first node may be at least one first leaf node, such that the information for the multiple second child nodes may be allocated to the at least one first leaf node. Also, all of the multiple second child nodes may be associated with a same bottom level acceleration structure (BLAS) identifier (ID) in a set of BLAS IDs, and the at least one first leaf node may be associated with a top level acceleration structure (TLAS) node ID.

At 1050, GPU 1002 may store the allocated information for the plurality of second nodes in the set of second nodes in the at least one first node in the set of first nodes (e.g., GPU 1002 may store information 1062 in memory 1006). In some aspects, the information for the plurality of second nodes may correspond to a bounding box for each of the plurality of second nodes, such that the information for the plurality of second nodes may correspond to a plurality of bounding boxes. The bounding box for each of the plurality of second nodes may be associated with an identifier (ID) for each of the plurality of second nodes, such that at least one of the bounding box or the ID for each of the plurality of second nodes may be stored in the at least one first node. In some aspects, the allocated information for the plurality of second nodes may be further stored in a graphics memory (GMEM) or a system memory.

At 1060, GPU 1002 may program a graphics processing unit (GPU) to traverse the BVH structure including the plurality of nodes based on the allocated information for the plurality of second nodes that is stored in the at least one first node.

Figure 11:
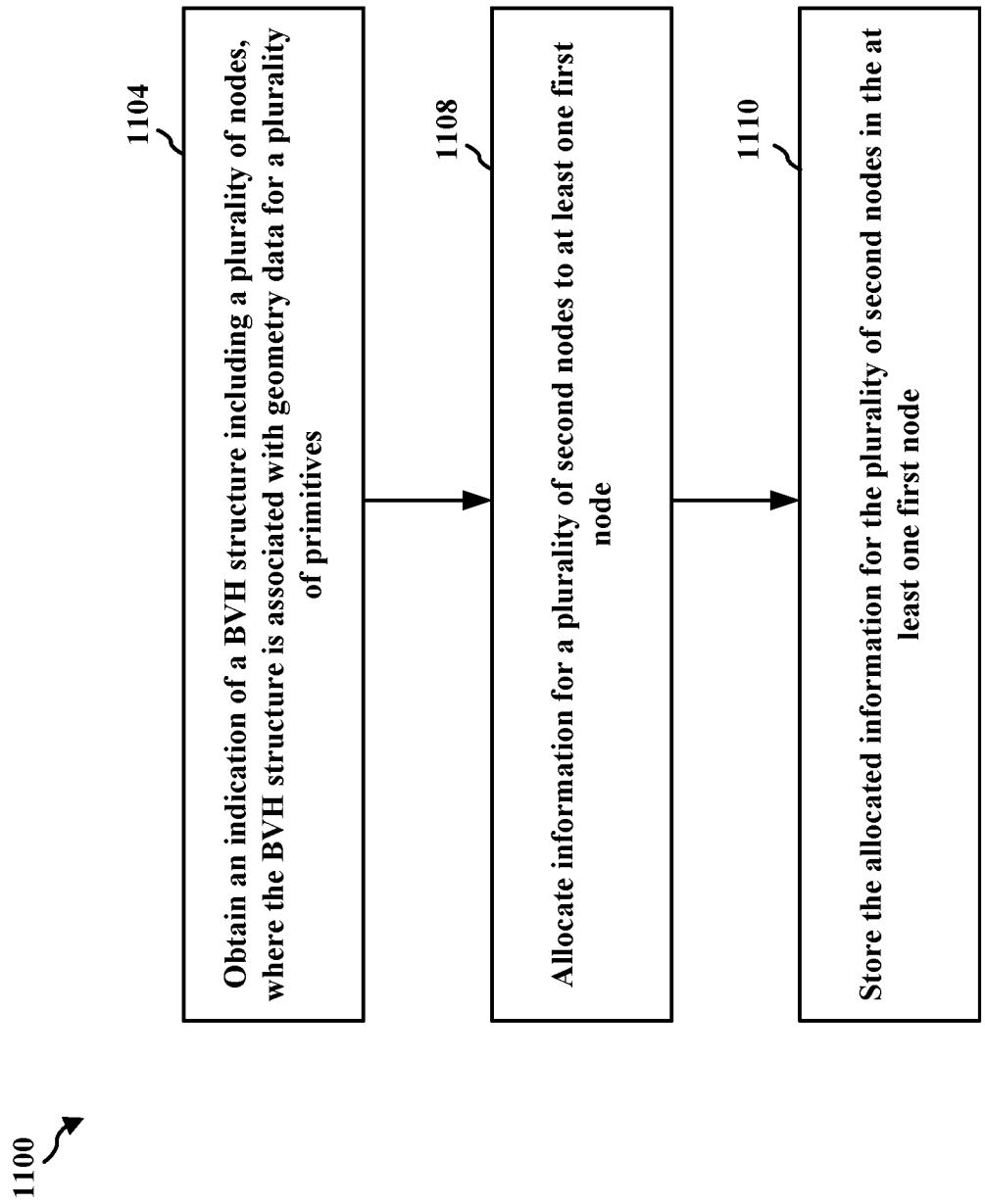
FIG. 11 is a flowchart of an example method of graphics processing.

FIG. 11 is a flowchart 1100 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-10. The methods described herein may provide a number of benefits, such as improving resource utilization and/or power savings.

At 1104, the GPU may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes, as described in connection with the examples in FIGS. 1-10. For example, as described in 1020 of FIG. 10, GPU 1002 may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes. Further, step 1104 may be performed by processing unit 120 in FIG. 1. The BVH structure may be based on a hierarchy of the plurality of nodes including the set of first nodes and the set of second nodes. The first level BVH may correspond to a top level BVH in the BVH structure and the second level BVH may correspond to bottom level BVH in the BVH structure, such that the set of first nodes is a set of top level nodes and the set of second nodes is a set of bottom level nodes. The set of top level nodes may include at least one top level internal node and a set of top level leaf nodes, and the set of bottom level nodes may include at least one bottom level internal node and a set of bottom level leaf nodes. In some aspects, the set of first nodes may be associated with a first amount of rays in a ray tracing process for the plurality of primitives in the scene, and the set of second nodes may be associated with a second amount of rays in the ray tracing process for the plurality of primitives in the scene. Additionally, the set of first nodes may be associated with a top level acceleration structure (TLAS) identifier (ID), where each of the set of second nodes may be associated with a corresponding bottom level acceleration structure (BLAS) ID in a set of BLAS IDs, and where each corresponding BLAS ID may be associated with at least one second node in the set of second nodes. Further, the indication of the BVH structure may be obtained from a central processing unit (CPU) or at least one component in a graphics processing unit (GPU).

At 1108, the GPU may allocate information for a plurality of second nodes in the set of second nodes to at least one first node in the set of first nodes, as described in connection with the examples in FIGS. 1-10. For example, as described in 1040 of FIG. 10, GPU 1002 may allocate information for a plurality of second nodes in the set of second nodes to at least one first node in the set of first nodes. Further, step 1108 may be performed by processing unit 120 in FIG. 1. The information for the plurality of second nodes may be allocated based on surface area heuristics (SAH), such that the information for the plurality of second nodes may be allocated based on a surface area corresponding to each of the plurality of second nodes, and where the surface area may be associated with a same bottom level acceleration structure (BLAS) identifier (ID) in a set of BLAS IDs. In some instances, the plurality of second nodes may include multiple second child nodes that are associated with a second root node in the set of second nodes, and the at least one first node may be at least one first leaf node, such that the information for the multiple second child nodes may be allocated to the at least one first leaf node. Also, all of the multiple second child nodes may be associated with a same bottom level acceleration structure (BLAS) identifier (ID) in a set of BLAS IDs, and the at least one first leaf node may be associated with a top level acceleration structure (TLAS) node ID.

At 1110, the GPU may store the allocated information for the plurality of second nodes in the set of second nodes in the at least one first node in the set of first nodes, as described in connection with the examples in FIGS. 1-10. For example, as described in 1050 of FIG. 10, GPU 1002 may store the allocated information for the plurality of second nodes in the set of second nodes in the at least one first node in the set of first nodes. Further, step 1110 may be performed by processing unit 120 in FIG. 1. In some aspects, the information for the plurality of second nodes may correspond to a bounding box for each of the plurality of second nodes, such that the information for the plurality of second nodes may correspond to a plurality of bounding boxes. The bounding box for each of the plurality of second nodes may be associated with an identifier (ID) for each of the plurality of second nodes, such that at least one of the bounding box or the ID for each of the plurality of second nodes may be stored in the at least one first node. In some aspects, the allocated information for the plurality of second nodes may be further stored in a graphics memory (GMEM) or a system memory.

Figure 12:
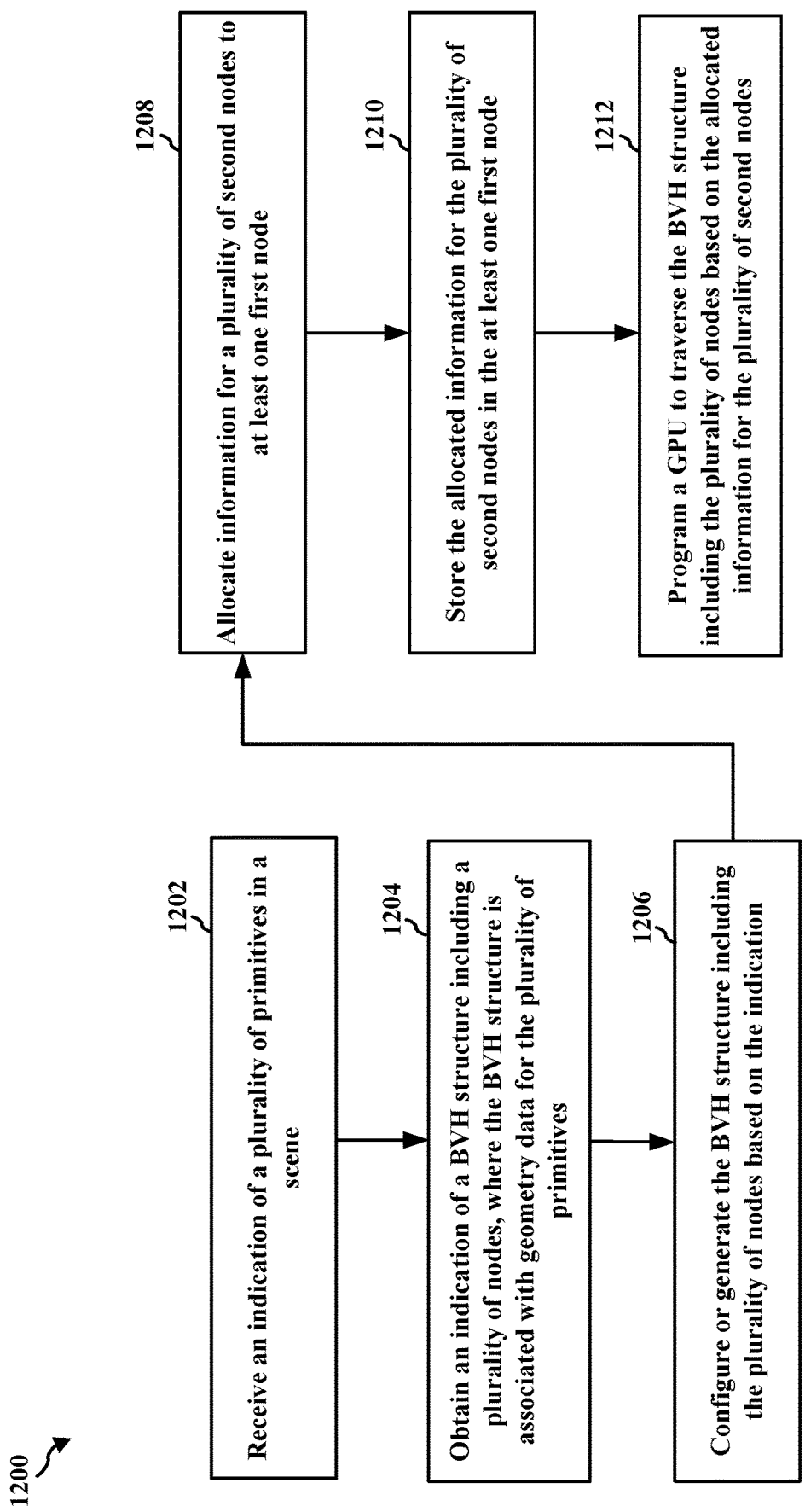
FIG. 12 is a flowchart of an example method of graphics processing.

FIG. 12 is a flowchart 1200 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-10. The methods described herein may provide a number of benefits, such as improving resource utilization and/or power savings.

At 1202, the GPU may receive a second indication of a plurality of primitives in a scene prior to obtaining an indication of a bounding volume hierarchy (BVH) structure, where the indication of a BVH structure is obtained based on the second indication of the plurality of primitives, as described in connection with the examples in FIGS. 1-10. For example, as described in 1010 of FIG. 10, GPU 1002 may receive a second indication of a plurality of primitives in a scene prior to obtaining an indication of a bounding volume hierarchy (BVH) structure, where the indication of a BVH structure is obtained based on the second indication of the plurality of primitives. Further, step 1202 may be performed by processing unit 120 in FIG. 1.

At 1204, the GPU may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes, as described in connection with the examples in FIGS. 1-10. For example, as described in 1020 of FIG. 10, GPU 1002 may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes. Further, step 1204 may be performed by processing unit 120 in FIG. 1. The BVH structure may be based on a hierarchy of the plurality of nodes including the set of first nodes and the set of second nodes. The first level BVH may correspond to a top level BVH in the BVH structure and the second level BVH may correspond to bottom level BVH in the BVH structure, such that the set of first nodes is a set of top level nodes and the set of second nodes is a set of bottom level nodes. The set of top level nodes may include at least one top level internal node and a set of top level leaf nodes, and the set of bottom level nodes may include at least one bottom level internal node and a set of bottom level leaf nodes. In some aspects, the set of first nodes may be associated with a first amount of rays in a ray tracing process for the plurality of primitives in the scene, and the set of second nodes may be associated with a second amount of rays in the ray tracing process for the plurality of primitives in the scene. Additionally, the set of first nodes may be associated with a top level acceleration structure (TLAS) identifier (ID), where each of the set of second nodes may be associated with a corresponding bottom level acceleration structure (BLAS) ID in a set of BLAS IDs, and where each corresponding BLAS ID may be associated with at least one second node in the set of second nodes. Further, the indication of the BVH structure may be obtained from a central processing unit (CPU) or at least one component in a graphics processing unit (GPU).

At 1206, the GPU may configure or generate the BVH structure including the plurality of nodes based on obtaining the indication of the BVH structure including the plurality of nodes, as described in connection with the examples in FIGS. 1-10. For example, as described in 1030 of FIG. 10, GPU 1002 may configure or generate the BVH structure including the plurality of nodes based on obtaining the indication of the BVH structure including the plurality of nodes. Further, step 1206 may be performed by processing unit 120 in FIG. 1.

At 1208, the GPU may allocate information for a plurality of second nodes in the set of second nodes to at least one first node in the set of first nodes, as described in connection with the examples in FIGS. 1-10. For example, as described in 1040 of FIG. 10, GPU 1002 may allocate information for a plurality of second nodes in the set of second nodes to at least one first node in the set of first nodes. Further, step 1208 may be performed by processing unit 120 in FIG. 1. The information for the plurality of second nodes may be allocated based on surface area heuristics (SAH), such that the information for the plurality of second nodes may be allocated based on a surface area corresponding to each of the plurality of second nodes, and where the surface area may be associated with a same bottom level acceleration structure (BLAS) identifier (ID) in a set of BLAS IDs. In some instances, the plurality of second nodes may include multiple second child nodes that are associated with a second root node in the set of second nodes, and the at least one first node may be at least one first leaf node, such that the information for the multiple second child nodes may be allocated to the at least one first leaf node. Also, all of the multiple second child nodes may be associated with a same bottom level acceleration structure (BLAS) identifier (ID) in a set of BLAS IDs, and the at least one first leaf node may be associated with a top level acceleration structure (TLAS) node ID.

At 1210, the GPU may store the allocated information for the plurality of second nodes in the set of second nodes in the at least one first node in the set of first nodes, as described in connection with the examples in FIGS. 1-10. For example, as described in 1050 of FIG. 10, GPU 1002 may store the allocated information for the plurality of second nodes in the set of second nodes in the at least one first node in the set of first nodes. Further, step 1210 may be performed by processing unit 120 in FIG. 1. In some aspects, the information for the plurality of second nodes may correspond to a bounding box for each of the plurality of second nodes, such that the information for the plurality of second nodes may correspond to a plurality of bounding boxes. The bounding box for each of the plurality of second nodes may be associated with an identifier (ID) for each of the plurality of second nodes, such that at least one of the bounding box or the ID for each of the plurality of second nodes may be stored in the at least one first node. In some aspects, the allocated information for the plurality of second nodes may be further stored in a graphics memory (GMEM) or a system memory.

At 1212, the GPU may program a graphics processing unit (GPU) to traverse the BVH structure including the plurality of nodes based on the allocated information for the plurality of second nodes that is stored in the at least one first node, as described in connection with the examples in FIGS. 1-10. For example, as described in 1060 of FIG. 10, GPU 1002 may program a graphics processing unit (GPU) to traverse the BVH structure including the plurality of nodes based on the allocated information for the plurality of second nodes that is stored in the at least one first node. Further, step 1212 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for obtaining an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes. The apparatus, e.g., processing unit 120, may also include means for allocating information for a plurality of second nodes in the set of second nodes to at least one first node in the set of first nodes. The apparatus, e.g., processing unit 120, may also include means for storing the allocated information for the plurality of second nodes in the set of second nodes in the at least one first node in the set of first nodes. The apparatus, e.g., processing unit 120, may also include means for programming a graphics processing unit (GPU) to traverse the BVH structure including the plurality of nodes based on the allocated information for the plurality of second nodes that is stored in the at least one first node. The apparatus, e.g., processing unit 120, may also include means for receiving a second indication of the plurality of primitives in the scene prior to obtaining the indication of the BVH structure, where the indication of a BVH structure is obtained based on the second indication of the plurality of primitives. The apparatus, e.g., processing unit 120, may also include means for configuring or generating the BVH structure including the plurality of nodes based on obtaining the indication of the BVH structure including the plurality of nodes.

The subject matter described herein may be implemented to realize one or more benefits or advantages. For instance, the described graphics processing techniques may be used by a GPU, a graphics processor, or some other processor that may perform graphics processing to implement the node storage techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize node storage techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and, based at least in part on information stored in the memory, the at least one processor is configured to: obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where a first level BVH in the BVH structure includes a set of first nodes and a second level BVH in the BVH structure includes a set of second nodes; allocate information for a plurality of second nodes in the set of second nodes to at least one first node in the set of first nodes; and store the allocated information for the plurality of second nodes in the set of second nodes in the at least one first node in the set of first nodes.

Aspect 2 is the apparatus of aspect 1, where the BVH structure is based on a hierarchy of the plurality of nodes including the set of first nodes and the set of second nodes.

Aspect 3 is the apparatus of aspect 2, where the first level BVH corresponds to a top level BVH in the BVH structure and the second level BVH corresponds to bottom level BVH in the BVH structure, such that the set of first nodes is a set of top level nodes and the set of second nodes is a set of bottom level nodes.

Aspect 4 is the apparatus of aspect 3, where the set of top level nodes includes at least one top level internal node and a set of top level leaf nodes, and where the set of bottom level nodes includes at least one bottom level internal node and a set of bottom level leaf nodes.

Aspect 5 is the apparatus of aspect 2, where the set of first nodes is associated with a first amount of rays in a ray tracing process for the plurality of primitives in the scene, and where the set of second nodes are associated with a second amount of rays in the ray tracing process for the plurality of primitives in the scene.

Aspect 6 is the apparatus of any of aspects 1 to 5, where the information for the plurality of second nodes is allocated based on surface area heuristics (SAH), such that the information for the plurality of second nodes is allocated based on a surface area corresponding to each of the plurality of second nodes, and where the surface area is associated with a same bottom level acceleration structure (BLAS) identifier (ID) in a set of BLAS IDs.

Aspect 7 is the apparatus of any of aspects 1 to 6, where the plurality of second nodes includes multiple second child nodes that are associated with a second root node in the set of second nodes, and where the at least one first node is at least one first leaf node, such that the information for the multiple second child nodes is allocated to the at least one first leaf node.

Aspect 8 is the apparatus of aspect 7, where all of the multiple second child nodes are associated with a same bottom level acceleration structure (BLAS) identifier (ID) in a set of BLAS IDs, and where the at least one first leaf node is associated with a top level acceleration structure (TLAS) node ID.

Aspect 9 is the apparatus of any of aspects 1 to 8, where the at least one processor is further configured to: program a graphics processing unit (GPU) to traverse the BVH structure including the plurality of nodes based on the allocated information for the plurality of second nodes that is stored in the at least one first node.

Aspect 10 is the apparatus of any of aspects 1 to 9, where the information for the plurality of second nodes corresponds to a bounding box for each of the plurality of second nodes, such that the information for the plurality of second nodes corresponds to a plurality of bounding boxes.

Aspect 11 is the apparatus of aspect 10, where the bounding box for each of the plurality of second nodes is associated with an identifier (ID) for each of the plurality of second nodes, such that at least one of the bounding box or the ID for each of the plurality of second nodes is stored in the at least one first node.

Aspect 12 is the apparatus of any of aspects 1 to 11, where the at least one processor is further configured to: receive a second indication of the plurality of primitives in the scene prior to obtaining the indication of the BVH structure, where the indication of a BVH structure is obtained based on the second indication of the plurality of primitives.

Aspect 13 is the apparatus of any of aspects 1 to 12, where the set of first nodes is associated with a top level acceleration structure (TLAS) identifier (ID), where each of the set of second nodes is associated with a corresponding bottom level acceleration structure (BLAS) ID in a set of BLAS IDs, and where each corresponding BLAS ID is associated with at least one second node in the set of second nodes.

Aspect 14 is the apparatus of any of aspects 1 to 13, where the at least one processor is further configured to: configure or generate the BVH structure including the plurality of nodes based on obtaining the indication of the BVH structure including the plurality of nodes.

Aspect 15 is the apparatus of any of aspects 1 to 14, where the indication of the BVH structure is obtained from a central processing unit (CPU) or at least one component in a graphics processing unit (GPU).

Aspect 16 is the apparatus of any of aspects 1 to 15, where the allocated information for the plurality of second nodes is further stored in a graphics memory (GMEM) or a system memory.

Aspect 17 is the apparatus of any of aspects 1 to 16, where the apparatus is a wireless communication device, further including at least one of an antenna or a transceiver coupled to the at least one processor, where the at least one processor is configured to obtain the indication of the BVH structure including a plurality of nodes via at least one of the antenna or the transceiver.

Aspect 18 is a method of graphics processing for implementing any of aspects 1 to 17.

Aspect 19 is an apparatus for graphics processing including means for implementing any of aspects 1 to 17.

Aspect 20 is a computer-readable medium (e.g., a non-transitory computer-readable medium) storing computer executable code, the code when executed by at least one processor causes the at least one processor to implement any of aspects 1 to 17.

What is claimed is:

1. An apparatus for graphics processing, comprising:
  a memory; and
  at least one processor coupled to the memory and, based at least in part on first information stored in the memory, the at least one processor is configured to:
    obtain an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein a first level BVH in the BVH structure includes a set of first nodes and a second level BVH in the BVH structure includes a set of second nodes;

allocate information for a plurality of second nodes in the set of second nodes to at least one first node in the set of first nodes; and store the allocated information for the plurality of second nodes in the set of second nodes in the at least one first node in the set of first nodes.

2. The apparatus of claim 1, wherein the BVH structure is based on a hierarchy of the plurality of nodes including the set of first nodes and the set of second nodes.

3. The apparatus of claim 2, wherein the first level BVH corresponds to a top level BVH in the BVH structure and the second level BVH corresponds to bottom level BVH in the BVH structure, such that the set of first nodes is a set of top level nodes and the set of second nodes is a set of bottom level nodes.

4. The apparatus of claim 3, wherein the set of top level nodes includes at least one top level internal node and a set of top level leaf nodes, and wherein the set of bottom level nodes includes at least one bottom level internal node and a set of bottom level leaf nodes.

5. The apparatus of claim 2, wherein the set of first nodes is associated with a first amount of rays in a ray tracing process for the plurality of primitives in the scene, and wherein the set of second nodes are associated with a second amount of rays in the ray tracing process for the plurality of primitives in the scene.

6. The apparatus of claim 1, wherein the information for the plurality of second nodes is allocated based on surface area heuristics (SAH), such that the information for the plurality of second nodes is allocated based on a surface area corresponding to each of the plurality of second nodes, and wherein the surface area is associated with a same bottom level acceleration structure (BLAS) identifier (ID) in a set of BLAS IDs.

7. The apparatus of claim 1, wherein the plurality of second nodes includes multiple second child nodes that are associated with a second root node in the set of second nodes, and wherein the at least one first node is at least one first leaf node, such that the information for the multiple second child nodes is allocated to the at least one first leaf node.

8. The apparatus of claim 7, wherein all of the multiple second child nodes are associated with a same bottom level acceleration structure (BLAS) identifier (ID) in a set of BLAS IDs, and wherein the at least one first leaf node is associated with a top level acceleration structure (TLAS) node ID.

9. The apparatus of claim 1, wherein the at least one processor is further configured to:

program a graphics processing unit (GPU) to traverse the BVH structure including the plurality of nodes based on the allocated information for the plurality of second nodes that is stored in the at least one first node.

10. The apparatus of claim 1, wherein the information for the plurality of second nodes corresponds to a bounding box for each of the plurality of second nodes, such that the information for the plurality of second nodes corresponds to a plurality of bounding boxes.

11. The apparatus of claim 10, wherein the bounding box for each of the plurality of second nodes is associated with an identifier (ID) for each of the plurality of second nodes, such that at least one of the bounding box or the ID for each of the plurality of second nodes is stored in the at least one first node.

12. The apparatus of claim 1, wherein the at least one processor is further configured to:

receive a second indication of the plurality of primitives in the scene prior to obtaining the indication of the BVH structure, wherein the indication of a BVH structure is obtained based on the second indication of the plurality of primitives.

13. The apparatus of claim 1, wherein the set of first nodes is associated with a top level acceleration structure (TLAS) identifier (ID), wherein each of the set of second nodes is associated with a corresponding bottom level acceleration structure (BLAS) ID in a set of BLAS IDs, and wherein each corresponding BLAS ID is associated with at least one second node in the set of second nodes.

14. The apparatus of claim 1, wherein the at least one processor is further configured to:

configure or generate the BVH structure including the plurality of nodes based on obtaining the indication of the BVH structure including the plurality of nodes.

15. The apparatus of claim 1, wherein the indication of the BVH structure is obtained from a central processing unit (CPU) or at least one component in a graphics processing unit (GPU).

16. The apparatus of claim 1, wherein the allocated information for the plurality of second nodes is further stored in a graphics memory (GMEM) or a system memory, wherein the apparatus is a wireless communication device, further comprising at least one of an antenna or a transceiver coupled to the at least one processor, wherein the at least one processor is configured to obtain the indication of the BVH structure via at least one of the antenna or the transceiver.

17. A method of graphics processing, comprising:

obtaining an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein a first level BVH in the BVH structure includes a set of first nodes and a second level BVH in the BVH structure includes a set of second nodes;

allocating information for a plurality of second nodes in the set of second nodes to at least one first node in the set of first nodes; and storing the allocated information for the plurality of second nodes in the set of second nodes in the at least one first node in the set of first nodes.

18. The method of claim 17, wherein the BVH structure is based on a hierarchy of the plurality of nodes including the set of first nodes and the set of second nodes.

19. The method of claim 18, wherein the first level BVH corresponds to a top level BVH in the BVH structure and the second level BVH corresponds to bottom level BVH in the BVH structure, such that the set of first nodes is a set of top level nodes and the set of second nodes is a set of bottom level nodes.

20. The method of claim 19, wherein the set of top level nodes includes at least one top level internal node and a set of top level leaf nodes, and wherein the set of bottom level nodes includes at least one bottom level internal node and a set of bottom level leaf nodes.

21. The method of claim 18, wherein the set of first nodes is associated with a first amount of rays in a ray tracing process for the plurality of primitives in the scene, and wherein the set of second nodes are associated with a second amount of rays in the ray tracing process for the plurality of primitives in the scene.

22. The method of claim 17, wherein the information for the plurality of second nodes is allocated based on surface area heuristics (SAH), such that the information for the plurality of second nodes is allocated based on a surface area corresponding to each of the plurality of second nodes, and wherein the surface area is associated with a same bottom level acceleration structure (BLAS) identifier (ID) in a set of BLAS IDs.

23. The method of claim 17, wherein the plurality of second nodes includes multiple second child nodes that are associated with a second root node in the set of second nodes, and wherein the at least one first node is at least one first leaf node, such that the information for the multiple second child nodes is allocated to the at least one first leaf node, wherein all of the multiple second child nodes are associated with a same bottom level acceleration structure (BLAS) identifier (ID) in a set of BLAS IDs, and wherein the at least one first leaf node is associated with a top level acceleration structure (TLAS) node ID.

24. The method of claim 17, further comprising:
programming a graphics processing unit (GPU) to traverse the BVH structure including the plurality of nodes based on the allocated information for the plurality of second nodes that is stored in the at least one first node.

25. The method of claim 17, wherein the information for the plurality of second nodes corresponds to a bounding box for each of the plurality of second nodes, such that the information for the plurality of second nodes corresponds to a plurality of bounding boxes, wherein the bounding box for each of the plurality of second nodes is associated with an identifier (ID) for each of the plurality of second nodes, such that at least one of the bounding box or the ID for each of the plurality of second nodes is stored in the at least one first node.

26. The method of claim 17, further comprising:
receiving a second indication of the plurality of primitives in the scene prior to obtaining the indication of the BVH structure, wherein the indication of a BVH structure is obtained based on the second indication of the plurality of primitives.

27. The method of claim 17, wherein the set of first nodes is associated with a top level acceleration structure (TLAS) identifier (ID), wherein each of the set of second nodes is associated with a corresponding bottom level acceleration structure (BLAS) ID in a set of BLAS IDs, and wherein each corresponding BLAS ID is associated with at least one second node in the set of second nodes.

28. The method of claim 17, further comprising:
configuring or generating the BVH structure including the plurality of nodes based on obtaining the indication of the BVH structure including the plurality of nodes, wherein the indication of the BVH structure is obtained from a central processing unit (CPU) or at least one component in a graphics processing unit (GPU), wherein the allocated information for the plurality of second nodes is further stored in a graphics memory (GMEM) or a system memory.

29. An apparatus for graphics processing, comprising:
means for obtaining an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein a first level BVH in the BVH structure includes a set of first nodes and a second level BVH in the BVH structure includes a set of second nodes;
means for allocating information for a plurality of second nodes in the set of second nodes to at least one first node in the set of first nodes; and
means for storing the allocated information for the plurality of second nodes in the set of second nodes in the at least one first node in the set of first nodes.

30. A non-transitory computer-readable medium storing computer executable code for graphics processing, the code when executed by a processor causes the processor to:
obtain an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein a first level BVH in the BVH structure includes a set of first nodes and a second level BVH in the BVH structure includes a set of second nodes;
allocate information for a plurality of second nodes in the set of second nodes to at least one first node in the set of first nodes; and store the allocated information for the plurality of second nodes in the set of second nodes in the at least one first node in the set of first nodes.

* * * * *